(12) United States Patent
Madden et al.

(10) Patent No.: US 8,267,798 B2
(45) Date of Patent: Sep. 18, 2012

(54) FORMED GREASE COVER RETENTION FEATURE

(75) Inventors: Michael Madden, Chapel Hill, NC (US); Brian Michael Valovick, Royal Oak, MI (US); Jake Lawson, St. Joseph, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 367 days.

(21) Appl. No.: 12/519,929

(22) PCT Filed: Dec. 18, 2007

(86) PCT No.: PCT/US2007/087898
§ 371 (c)(1),
(2), (4) Date: Sep. 10, 2009

(87) PCT Pub. No.: WO2008/077021
PCT Pub. Date: Jun. 26, 2008

(65) Prior Publication Data
US 2010/0016088 A1    Jan. 21, 2010

Related U.S. Application Data

(63) Continuation of application No. 11/957,600, filed on Dec. 17, 2007, now Pat. No. 7,905,785.

(60) Provisional application No. 60/870,515, filed on Dec. 18, 2006, provisional application No. 60/870,500, filed on Dec. 18, 2006.

(51) Int. Cl.
*F16D 3/22* (2006.01)
(52) U.S. Cl. .......................... 464/15; 464/906; 29/522.1
(58) Field of Classification Search .................... 464/15, 464/145, 170, 906; 403/23; 29/229, 235, 29/462, 522.1
See application file for complete search history.

(56) References Cited

U.S. PATENT DOCUMENTS

| | | | | |
|---|---|---|---|---|
| 1,641,269 | A | * | 9/1927 | Hoke ........................ 29/522.1 X |
| 3,287,934 | A | | 11/1966 | Asher |
| 4,356,930 | A | | 11/1982 | Roper |
| 4,436,310 | A | * | 3/1984 | Sawabe et al. |
| 4,550,486 | A | * | 11/1985 | Yarimizu .................... 29/235 X |
| 5,647,801 | A | | 7/1997 | Jacob |
| 6,203,441 | B1 | | 3/2001 | Iarrera |
| 6,237,920 | B1 | * | 5/2001 | Nicolai et al. |
| 6,699,129 | B2 | | 3/2004 | Wang |
| 6,793,581 | B2 | | 9/2004 | Meyer et al. |
| 7,226,360 | B2 | | 6/2007 | Lyon et al. |

* cited by examiner

*Primary Examiner* — Gregory Binda
(74) *Attorney, Agent, or Firm* — Jennifer M. Brumbaugh; Rader, Fishman & Grauer PLLC

(57) ABSTRACT

A connection system for a grease cover of a constant velocity joint includes a groove portion formed in a generally annular portion of the constant velocity joint. The generally annular portion is defined, at least in part, by an inner surface. The system also includes an insertion tool a grease cover selectively positioned at least partially within the groove portion. The grease cover includes an outer edge portion.

18 Claims, 8 Drawing Sheets

FORMED GREASE COVER RETENTION FEATURE

TECHNICAL FIELD

The present invention generally relates to constant velocity joints and specifically to grease covers therefore.

BACKGROUND ART

Constant velocity joints (CV joints) are common components in vehicles. Constant velocity joints are often employed where transmission of a constant velocity rotary motion is desired or required. CV joints are typically greased or otherwise lubricated for the life of the component. The joints are sealed to retain the grease or lubricant inside the joint while keeping contaminants and foreign matter, such as water and dirt, out of the joint. Moreover, a sealing boot, which may be made of rubber, thermoplastic, silicone material, or the like, usually encloses annular portions at an axial end of the CV joints with a shaft interposed therethrough. The opposing axial end may also be enclosed with a grease cover to seal the CV joint from the contaminants.

During operation, a CV joint may create excess internal pressures in the inner chamber of the joint. In such instances, it is often desirable to vent pressurized gases from the chamber of the joint to the outer atmosphere to reduce the internal temperature of the joint. This function can prevent undesirable pressure build-up during operation of the joint that could damage or compromise components such as the sealing boot. Consequently, many CV joints include techniques for venting. Examples of a known venting techniques include a small hole in the center of the grease cap. However, this venting technique may allow an unwanted release of the grease or lubricant.

FIG. 1 illustrates a CV joint 20 having a central axis A-A. CV joint 20 includes driven end 22 and a driving end 24. CV joint 20 further includes a joint assembly 26 coupled to a shaft 28 with a boot cover assembly 30 connected therebetween. CV joint 20 further includes a grease cover 32 that seals the driving end 24. Boot cover assembly 30 includes a metal cover 34 and a flexible boot 36. A portion of metal cover 34 is crimped onto boot 36 for attachment thereto. Boot cover assembly 30 and grease cover 32 protect the moving parts of CV joint 20 during operation by retaining the grease or lubricant inside the joint while keeping contaminants and foreign matter, such as water and dirt, out of the joint assembly 26.

The grease cover 32 may include a vent valve aperture to accommodate a vent valve (not shown). The joint assembly 26 includes a cage 40, a first rotational member or outer race 42, a second rotational member or inner race 44, and a plurality of balls (not shown). The cage 40 retains the balls between the first rotational member 42 and the second rotational member 44 in a generally equally spaced circumferential orientation. The shaft 28 is splined to second rotational member 44 to transmit torque.

Collectively, at least the shaft 28, boot cover assembly 30, first rotational member 42, and the grease cover 32 form a joint chamber 48. Joint chamber 48 contains grease or other lubricant (not shown) for lubrication between cage 40, first rotational member 42, second rotational member 44, and the balls.

The grease cover 32 has a generally circular body 50 defined, at least in part, by a peripheral edge 52 and a generally annular sealing surface 58, as best seen in FIGS. 1A and 2. The first rotational member 42 has a grease cover end 60 having a generally cylindrical inner surface 62 and a generally annular mating surface 64. A gasket 70 is interposed between the sealing surface 58 of the grease cover 32 and the mating surface 64 of the first rotational member 42.

During vehicle operation, CV joints 20 are typically heated due to the rotation and resulting friction between moving parts. After vehicle operation, the pressure within the joint chamber 48 typically increases due to the heat, and the lubricants are typically softened and have a lower viscosity due to the heat. The grease cover 32 is therefore required to seal the joint chamber 48 at varying operational temperatures and pressures.

Typically, the grease cover 32 is press fit into the first rotational member 42 by providing an interference fit between the inner surface 62 and the peripheral edge 52. Thus, the force required to press fit the grease cover 32 into the inner surface 62 defines the compressive force on the gasket 70. However, the expansion force generated by the gasket 70 acts against the retention of the grease cover 32 with the first rotational member 42. What is needed, therefore, is a method and apparatus for sealing a grease cover with a CV joint. A favorable method would result in a predictable amount of sealing force on a gasket, such as the gasket 70.

DISCLOSURE OF THE INVENTION

An embodiment of a connection system for a grease cover of a constant velocity joint includes a groove portion formed in a generally annular portion of the constant velocity joint. The generally annular portion is defined, at least in part, by an inner surface. The system also includes a grease cover selectively positioned at least partially within the groove portion. The grease cover includes an outer edge portion.

Another embodiment of a constant velocity joint includes a rotational member having a generally cylindrical surface. The generally cylindrical surface is defined, at least in part, by a groove portion. The constant velocity joint further includes a grease cover selectively positioned adjacent the rotational member. An edge portion of the grease cover is positioned within the groove to at least partially retain the grease cover in a desired position.

An embodiment of a method includes of assembling a constant velocity joint includes forming a groove in a generally cylindrical inner surface, and positioning a portion of a cover member within the groove. The inner surface defines a portion of the constant velocity joint.

BRIEF DESCRIPTION OF DRAWINGS

The present invention will now be described, by way of example, with reference to the accompanying drawings. Components in the drawings are not necessarily to scale, emphasis instead being placed upon clearly illustrating the principles of the present invention. Although the drawings represent some embodiments, certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description. Moreover, in the drawings, like reference numerals designate corresponding parts throughout several views.

DETAILED DESCRIPTION

Figure 1:
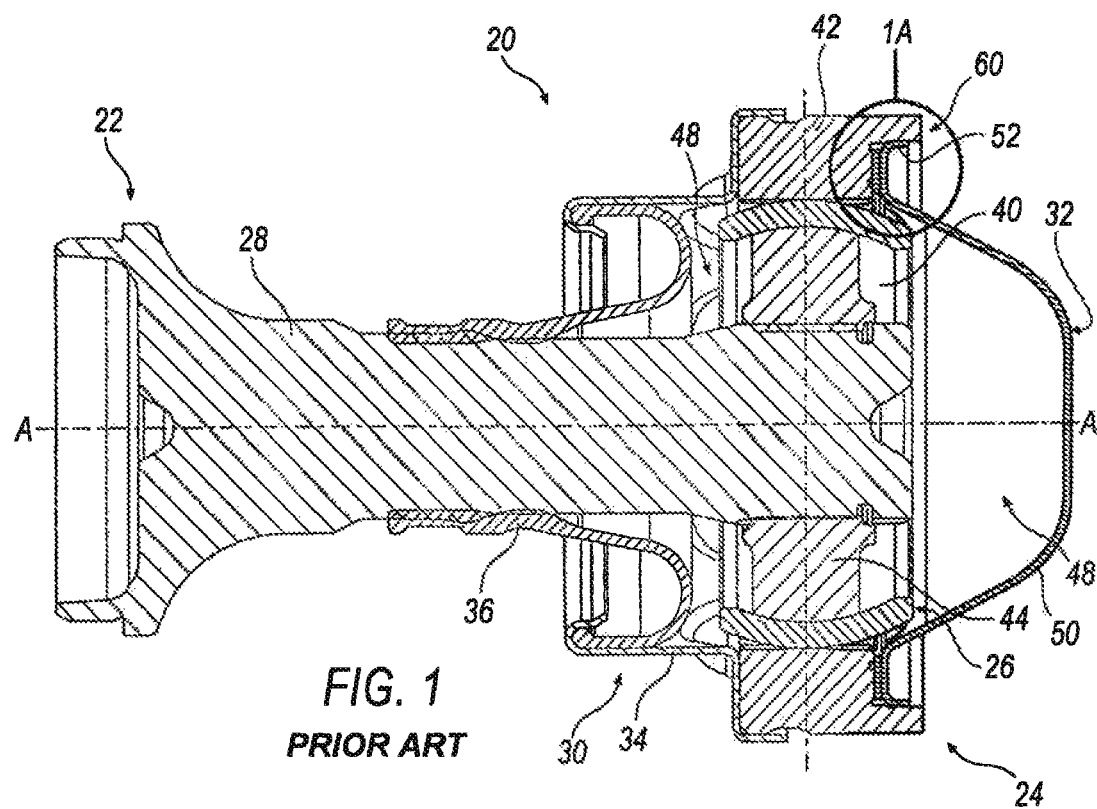
FIG. 1 is a sectional view of a constant velocity joint illustrating a grease cover.
Figure 1A:
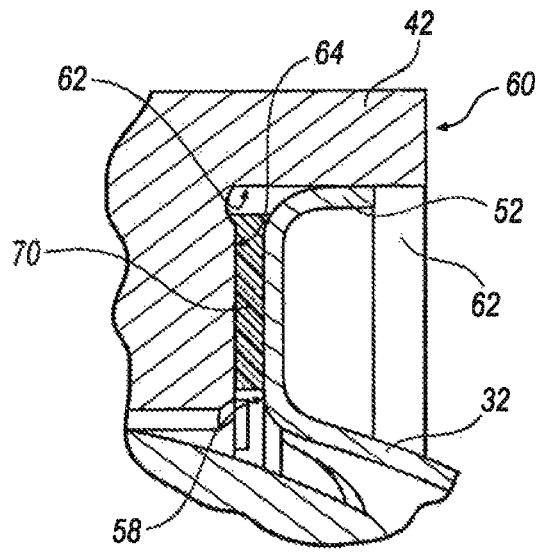
FIG. 1A is an enlarged view of area 1A of FIG. 1.
Figure 2:
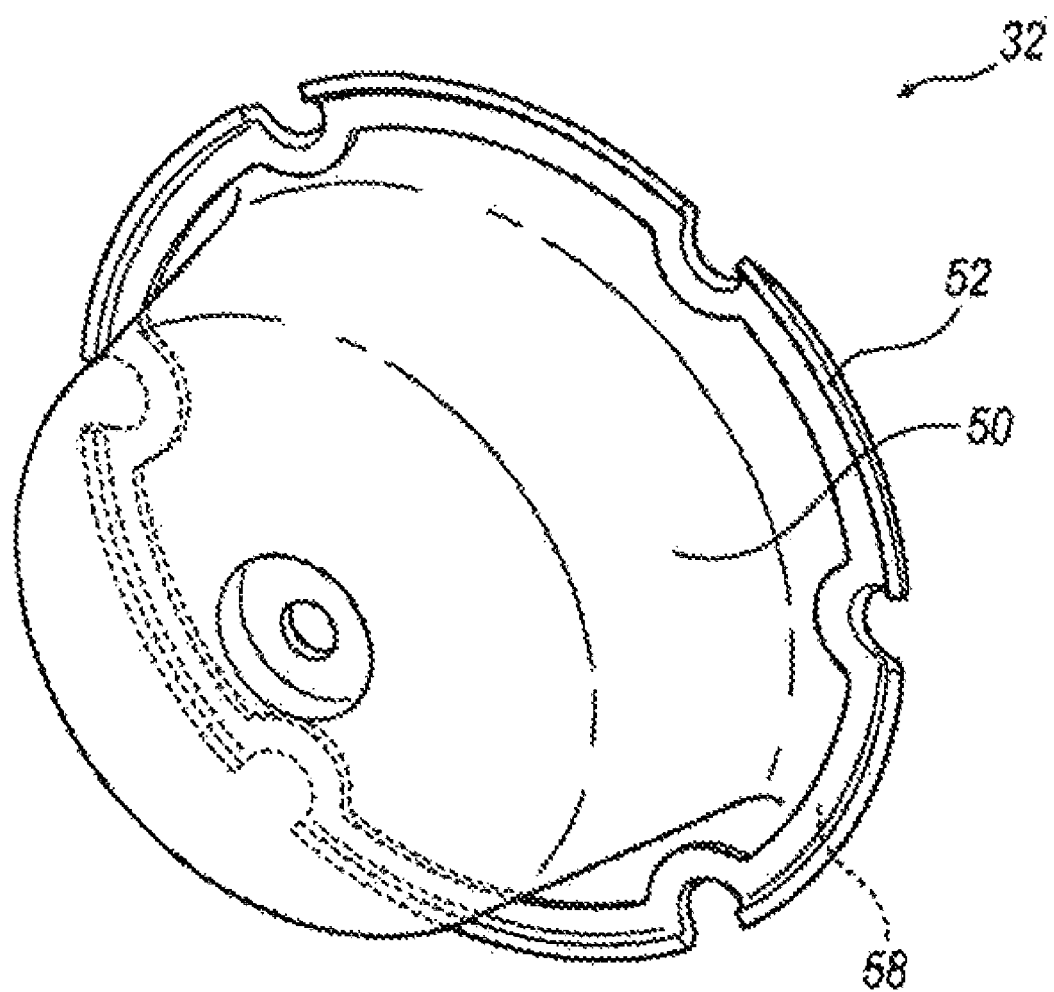
FIG. 2 is a perspective view the grease cover of FIG. 1.

Referring to the drawings, exemplary constant velocity joints are shown. The illustrated constant velocity joints and joint chambers may be fixed constant velocity joints of the monoblock style that may be used in the propeller shaft (prop shaft) of a vehicle. It should be noted, however, that any type of constant velocity joints and constant velocity joint chambers, including without limitation, tripod, fixed tripod, or the like may be used in accordance with the present invention. That is, one of ordinary skill in the art will recognize the advantages realized by the invention in substantially all types of constant velocity joints, and, therefore the invention should not be limited to the illustrated embodiments.

Figure 3:
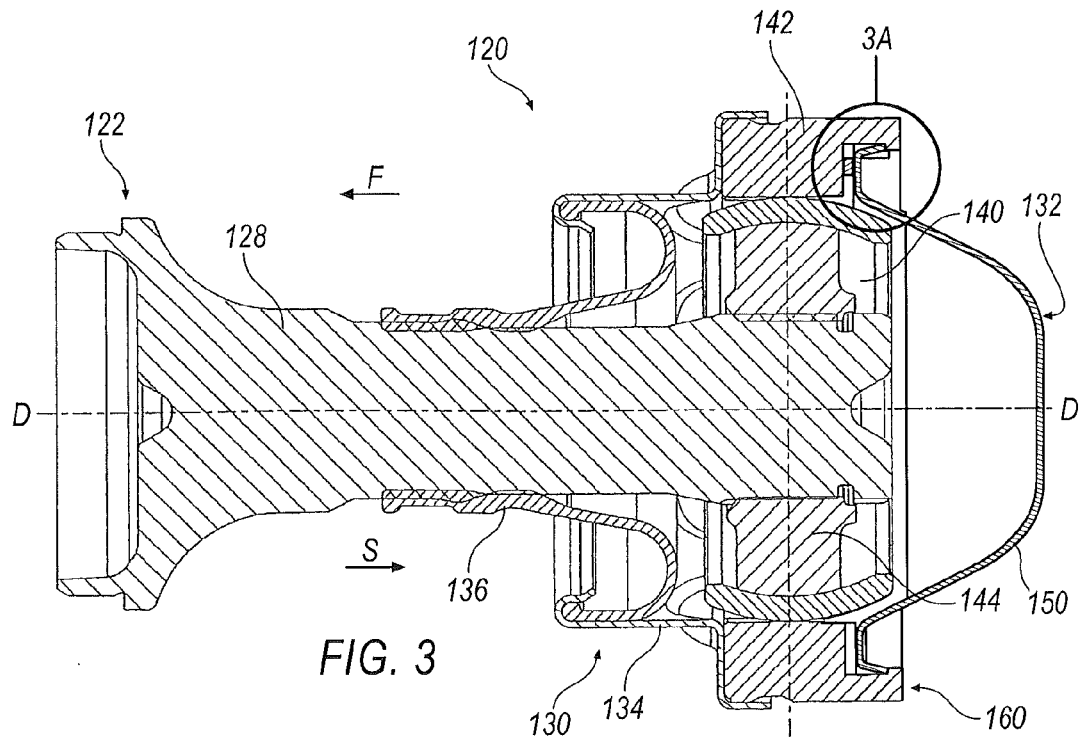
FIG. 3 is a sectional view of a constant velocity joint according to an embodiment.

FIG. 3 illustrates a CV joint 120 having a driven end 122 and a driving end 124, generally aligned along an axis D-D. CV joint 120 further includes a joint assembly 126 that is coupled to a shaft 128. A boot cover assembly 130 is connected between the joint assembly 126 and the shaft 128. Boot cover assembly 130 includes a metal cover 134 and a flexible boot 136. A cover member, or grease cover, 132 seals the driving end 124 of CV joint 120.

Joint assembly 126 includes a cage 140, a first rotational member or outer race 142, a second rotational member or inner race 144, and a plurality of balls (not shown). As illustrated, shaft 128 is splined to second rotational member 144.

Collectively, at least the shaft 128, boot cover assembly 130, and the first rotational member 142 form a joint chamber 148. The joint chamber 148 contains grease or other lubricant (not illustrated).

Figure 4:
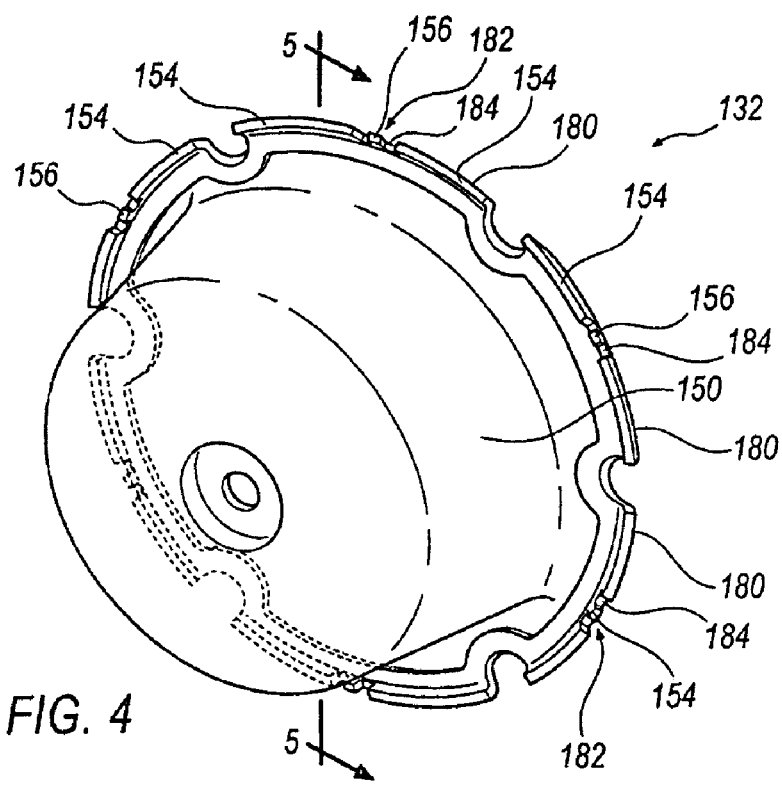
FIG. 4 is a perspective view a grease cover according to an embodiment.

As best seen in at least one of FIGS. 3 and 4, the grease cover 132 has a generally circular body 150 defined, at least in part, by a peripheral edge portion 152 defined, at least in part, by an end surface 154, finger portions, or edge portions, 156, and a generally annular sealing portion 158.

Figure 3A:
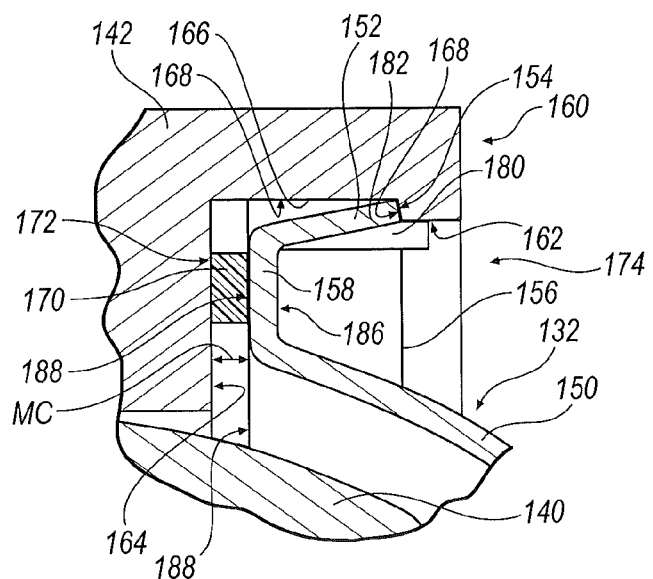
FIG. 3A is an enlarged view of area 3A of FIG. 3.

As best seen in FIG. 3A, the first rotational member 142 has a grease cover end 160 having a generally cylindrical inner surface 162 and a generally annular mating surface 164. The inner surface 162 has an annular groove 166, defined by a groove surface 168, formed therein. In some embodiments, the annular groove 166 may be formed generally continuous about the groove surface 168. A sealing ring, or sealing member, 170 is interposed between the sealing portion 158 of the grease cover 132 and the annular mating surface 164. The sealing member 170 extends generally between the sealing portion 158 and a distal surface 172 of the sealing member 170.

Figure 7:
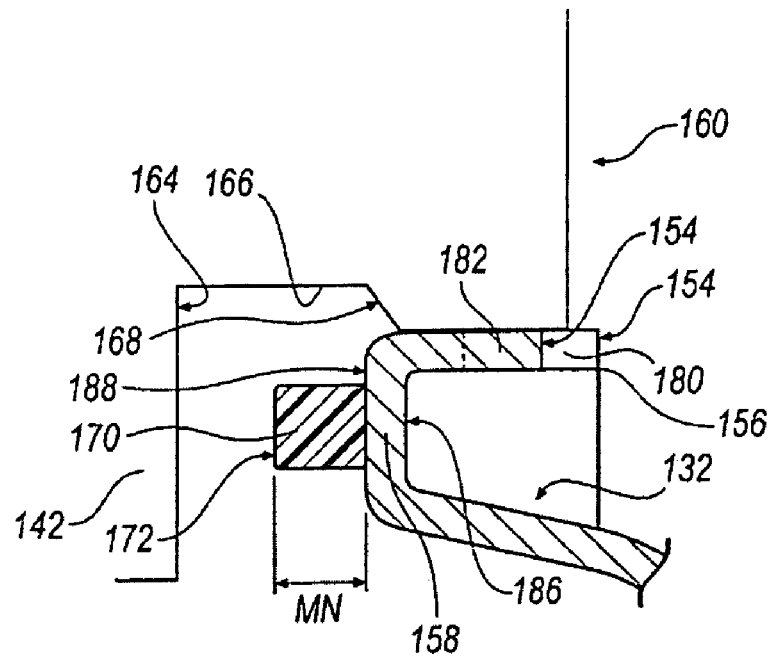
FIGS. 7-10 are sectional views of the portion of the CV joint of FIG. 3, illustrated in various steps of assembly with some section lines omitted for clarity.

The distal surface 172 of the sealing member 170 seals against the mating surface 164 of the first rotational member 142, as discussed in greater detail below. FIG. 3A illustrates the sealing member 170 in an installed, compressed configuration having a thickness of distance MC measured generally between the sealing portion 158 and the mating surface 164. FIG. 7 illustrates the sealing member 170 in an uninstalled, uncompressed configuration having a thickness of distance MN measured generally between the sealing portion 158 and the distal surface 172.

The inner surface 162 and the mating surface 164 form a recess 174 within the first rotational member 142. The inner surface 162, the mating surface 164 and the recess 174 are a portion of the joint chamber 148. Accordingly, the grease cover 132 seals at least a portion of the joint chamber 148.

Edge portions 156 of peripheral edge portion 152 include alignment members 180 and retaining members 182 that differ in form and function, as discussed below, although other embodiments may include generally only one type of edge portion 156, or may include greater than two types of edge portions 156. In the embodiment illustrated, alignment members 180 and retaining members 182 extend from the grease cover 132 and are separated by recessed portions 184. The peripheral edge portion 152 may be constructed of a resilient material for axially retaining the grease cover 132 relative to the first rotational member 142 and/or providing a desired value of compression on the sealing member 170. In some embodiments, a portion of the edge portion is not positioned within the groove 166 formed in the inner surface 162.

As seen in FIG. 4, the alignment members 180 may define a larger outer diameter than the retaining members 182 prior to assembly of the grease cover 132 to the first rotational member 142 (not shown in FIG. 4). That is, the alignment members 180 may extend farther from the sealing portion 158 of body 150 than the retaining members 182, as best seen in FIG. 3A. At least the retaining members 182 extend into the groove 166 after assembly of the grease cover 132 to the first rotational member 142, as seen in FIG. 3A, although other embodiments may include alignment members 180 that extend into the groove 166. In some embodiments, at least a portion of the end surfaces 154 do not contact the surface 168 defining a portion of the groove portion 166. The sealing portion 158 is defined, at least in part, by a tool mating surface 186 and a sealing surface 188.

As seen in FIGS. 5, 6, and 8-10, an insertion tool 190 may be used to install the grease cover 132. The insertion tool 190 is has a generally annular mating portion 192 and an expanding portion 194. The annular mating portion 192 includes a generally cylindrical outer surface 196, an inner support surface 198, and a grease cover urging surface 200. In the embodiment illustrated, the annular mating portion 192 is a body of rotation generally about the axis D-D of the partial section, although in other embodiments the insertion tool 190 may be formed of a radially segmented body of rotation.

Figure 5:
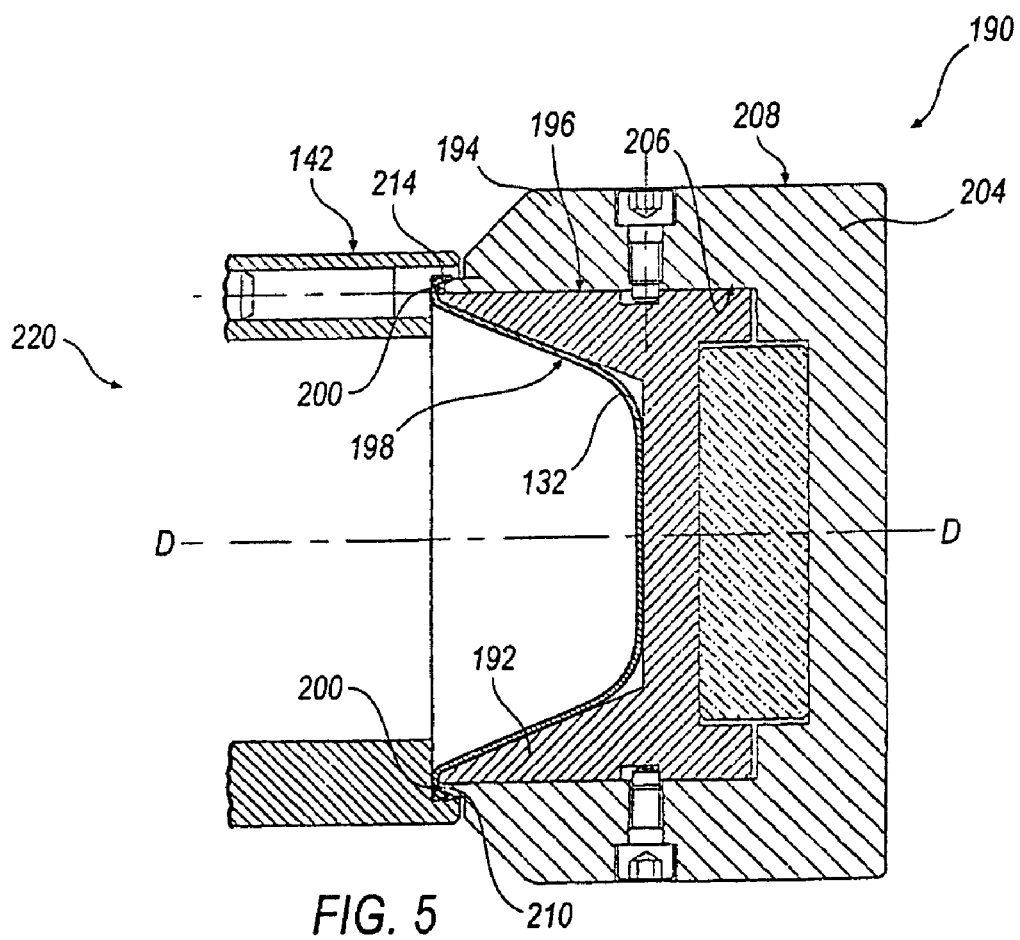
FIG. 5 is a partial sectional view of an embodiment of a constant velocity joint with a grease cover insertion tool.
Figure 6:
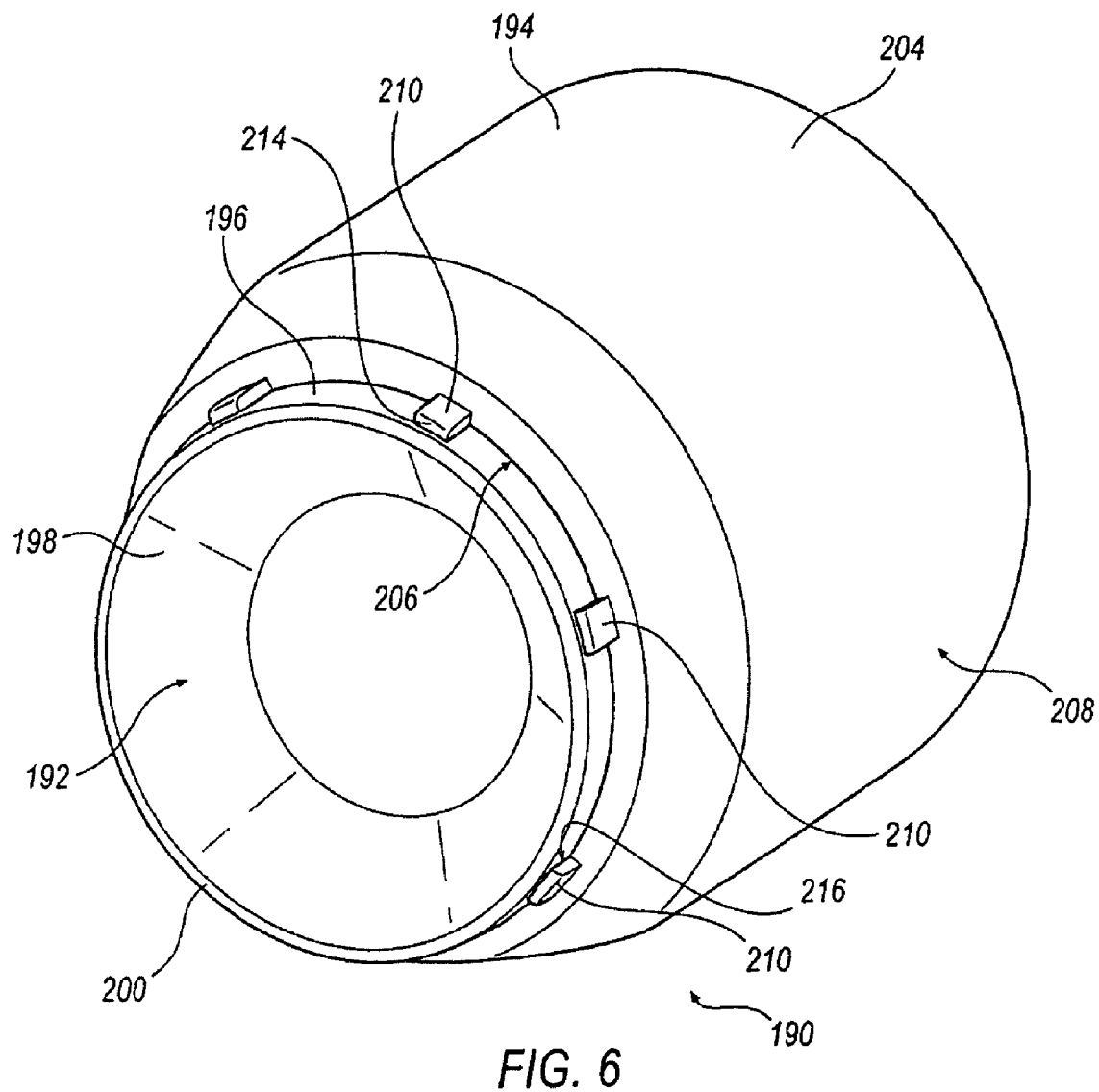
FIG. 6 is a perspective view of an embodiment of the insertion tool of FIG. 5.

The expanding portion 194, as best seen in FIG. 5, includes a generally annular body 204 defined, at least in part, by a generally cylindrical inner surface 206, an outer surface 208 and a plurality of extensions 210 extending therefrom. Extensions 210 have an expanding surface 214 and a guiding surface 216 (FIG. 6). As illustrated, the mating portion 192 is interposed within the expanding portion 194 and permitted to move rectilinearly relative thereto, generally along the axis D-D. That is, the outer surface 196 of the mating portion 192 is positioned adjacent the inner surface 206 of the expanding portion 194, permitting movement therebetween.

As discussed in greater detail below, the extensions 210 may urge the retaining members 182 into the groove 166 to retain the grease cover 132 axially relative to the remainder of the CV joint 120. Preferably, the expanding portion 194 has a number of extensions that is equal to the number of retaining portions 182, and each extension 210 will align with one retaining portion 182 of the grease cover 132, as described herein. Collectively, the insertion tool 190 and the CV joint 120 form a grease cover retention system.

Figure 8:
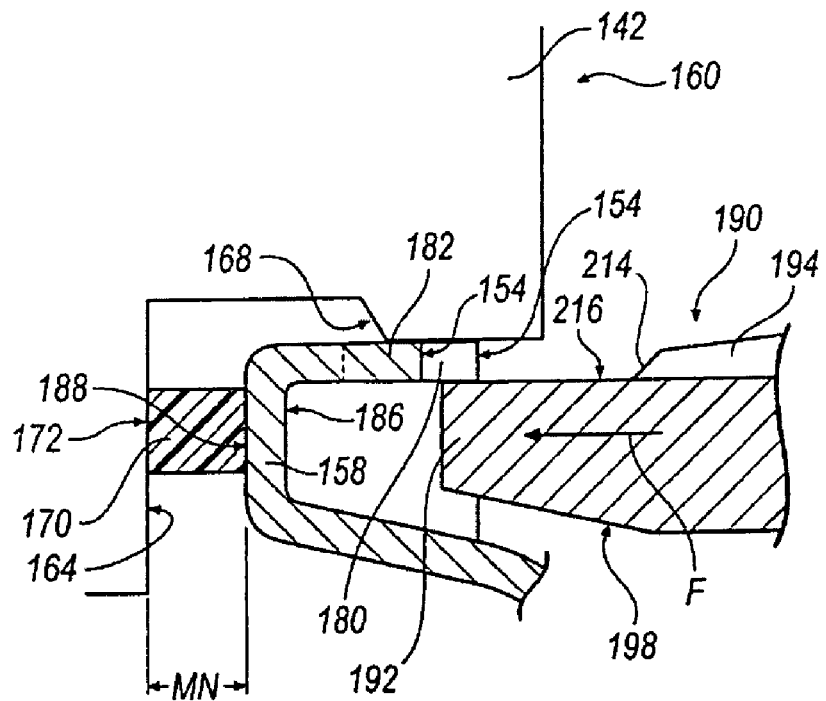

An embodiment of coupling the grease cover 132 to the CV joint 120 is described as follows, with specific reference to FIGS. 7-10. The grease cover 132 is positioned adjacent the insertion tool 190, such that the grease cover urging surface 200 is in contact with the tool mating surface 186 of the grease cover 132 and the retaining members 182 are aligned with the extensions 210 (FIG. 8).

The grease cover 132 and insertion tool 190 are positioned coaxially and in axial alignment with the grease cover end 160 of the first rotational member 142 by a user, or operator (not shown). Alternatively, the grease cover 132 may be first aligned with the grease cover end 160 and then the insertion tool 190.

The grease cover 132 and the first rotational member 142 are then urged together, as the mating portion 192 of the insertion tool 190 is urged in a first direction F relative to the grease cover end 160, and the peripheral edge portion 152 of the grease cover 132 may contact the inner surface 162.

The insertion tool 190 is guided generally along the axis D-D toward the shaft 128. The grease cover 132 is then further urged in the first direction F, as the grease cover urging surface 200 exerts a force on the tool mating surface 186, until the sealing member 170 contacts the mating surface 164.

Figure 9:
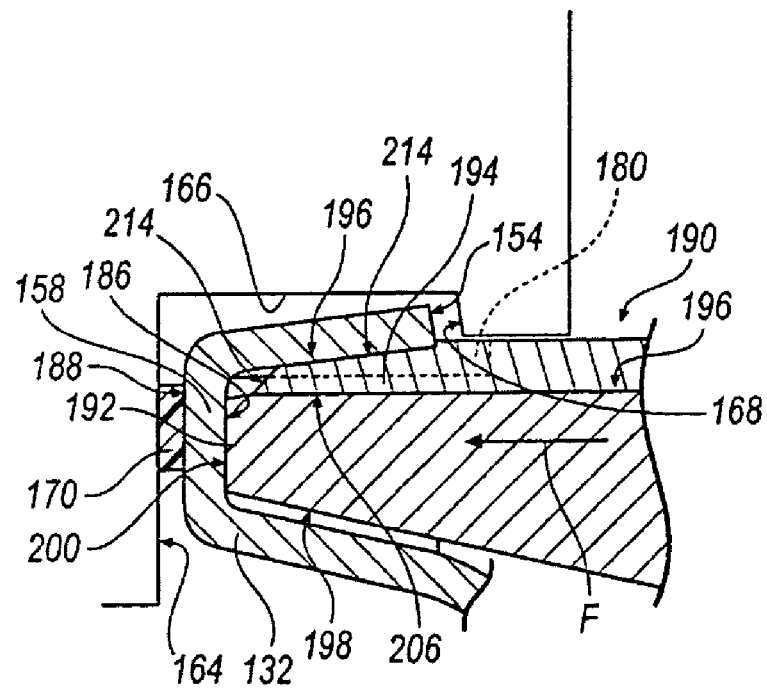
Figure 10:
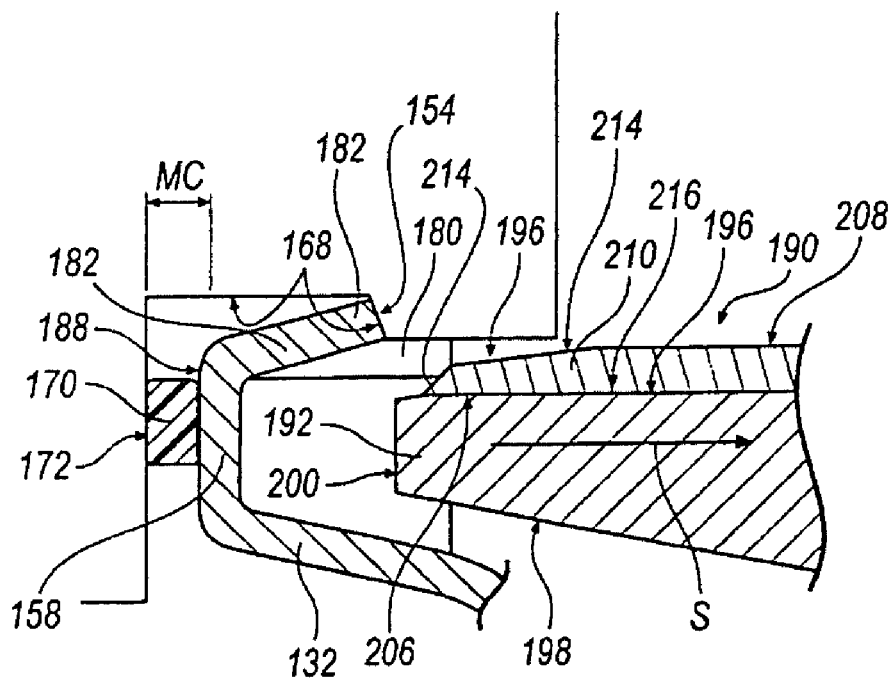

The grease cover 132 is then further urged in the first direction F until the sealing member 170 is compressed and the end surfaces 154 of the retaining members 182 are urged beyond the groove surface 168, as best seen in FIG. 9. After the end surfaces 154 are urged beyond the groove surface 168, the expanding portion 194 of the insertion tool 190 is then moved in the first direction F relative to the CV joint 120, as the mating portion 192 is retained in about a constant position relative to the CV joint 120. As the expanding portion 194 is moved in the first direction F, the expanding surfaces 214 of the extensions 210 urge the retaining members 182 radially outward as a portion of each retaining member 182 extends into the groove 166.

The insertion tool 190 may then be removed from the CV joint 120 as follows. The mating portion 192 is urged in the second direction S as the sealing member 170 resiliently expands between the sealing portion 158 and the mating surface 164. The insertion tool 190 is further urged in the second direction S until at least a portion of the end surface 154 of the retaining members 182 contacts at least a portion of the groove surface 168. Preferably, the end surface 154 bindingly contacts the groove surface 168. The insertion tool 190 is then further urged in a direction S until there is no contact between the insertion tool 190 and the grease cover 132.

The material for grease cover 132 is preferably a metallic material, and may be spring metal or a zinc plated low carbon steel. The grease cover 132 may also be a plastic, nylon or any non-metallic material surrounded in a metallic outer periphery 152.

Figure 11:
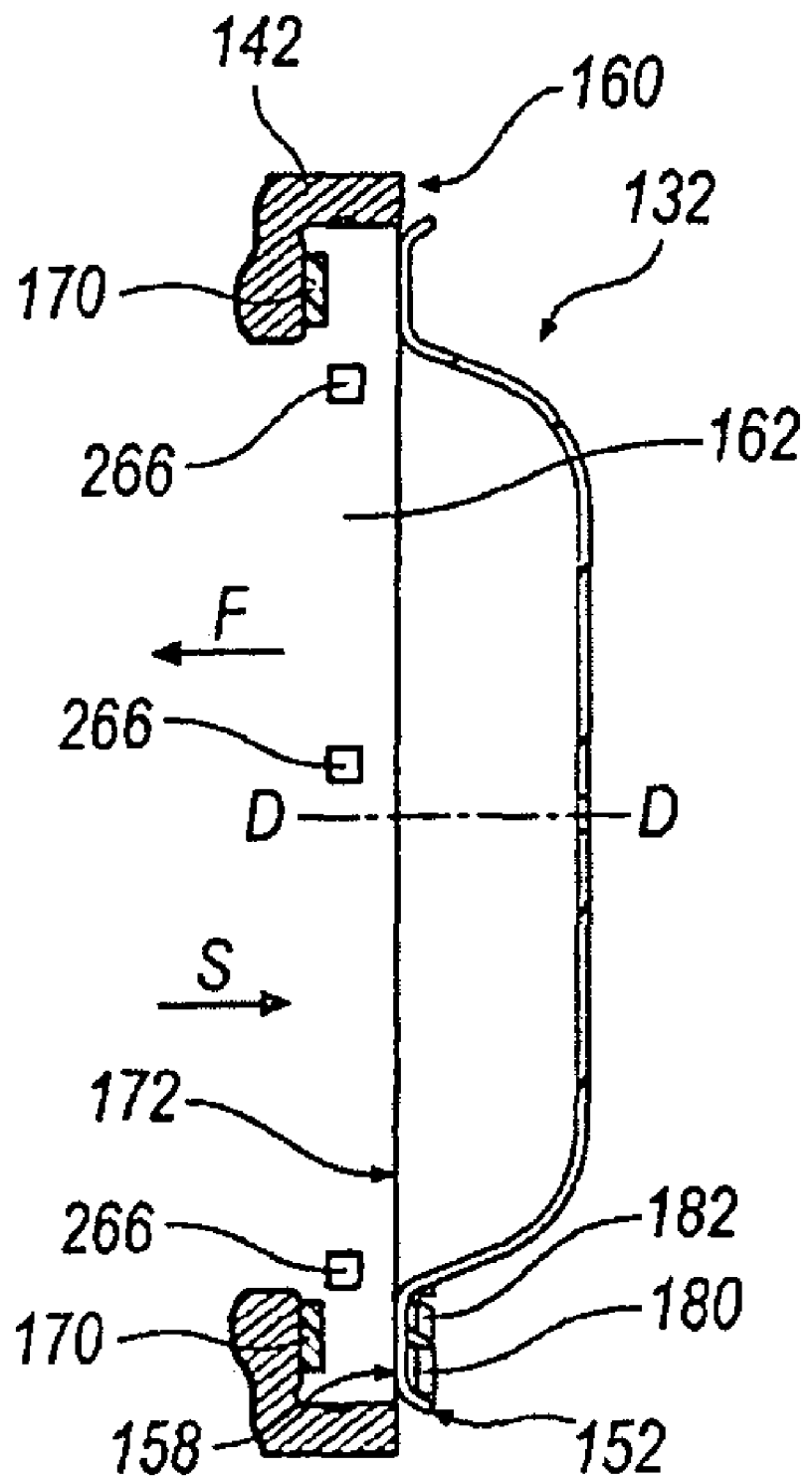
FIG. 11 is sectional view of an embodiment of a constant velocity joint.

In the embodiment illustrated in FIG. 7, the sealing member 170 is integrally molded, or other wise attached, to the sealing portion 158 of the grease cover 132. The sealing member 170 extends generally between the sealing portion 158 and a distal surface 172. In the embodiment of FIG. 11, the sealing member 170 is illustrated in an alternative embodiment where the sealing ring is not molded to the grease cover 132. Also illustrated in the embodiment of FIG. 11, the groove 166 is formed as distinct groove portions 266 formed in the inner surface 162. As will be appreciated, each retaining member 182 may be desirably positioned within a groove portion 266 to axially retain the grease cover 132 relative to the first rotational member 142.

In an alternative embodiment, the retaining members 182 may extend from the grease cover 132 such that the retaining members biasingly contact the inner surface 162 of the first rotational member 142 as the grease cover 132 is installed within the CV joint 120. The retaining members 182 may then resiliently deflect into groove 166 (or groove portions 266) as the grease cover 132 is moved in the first direction F sufficiently to permit such deflection, thereby permitting the installation of the grease cover 132 without the expanding portion 194 and/or the insertion tool 190.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

The invention claimed is:

1. A connection system for a grease cover of a constant velocity joint comprising:
    a groove portion formed in a generally annular portion of the constant velocity joint, wherein the generally annular portion is defined, at least in part, by an inner surface;
    a grease cover selectively positioned at least partially within the groove portion, wherein the grease cover includes an outer edge portion defining an outer circumference of the grease cover, and comprising at least one alignment member and at least one retaining member, wherein the at least one alignment member and the at least one retaining member are separated by a recessed portion; and
    an insertion tool for radially expanding at least a portion of the outer edge portion of the grease cover into a portion of the groove portion, wherein the insertion tool includes an expanding surface to selectively contact the outer edge portion of the grease cover.

2. The system of claim 1, wherein the inner surface is generally cylindrical.

3. The system of claim 1, wherein the generally annular portion is an outer race of the constant velocity joint.

4. The system of claim 1, wherein the outer edge portion is defined, at least in part, by an end surface, and at least a portion of the end surface bindingly engages at least a portion of a surface defining a portion of the groove portion to retain the grease cover in a desired axial position relative to the generally annular portion.

5. The system of claim 1, further comprising a sealing ring molded to a portion of the grease cover.

6. The system of claim 1, wherein the grease cover is defined, at least in part, by a peripheral end surface that selectively contacts a surface portion of the groove portion.

7. The system of claim 1, claim 7, wherein the insertion tool includes an expanding portion and a mating portion, the expanding portion is selectively axially moveable relative to the mating portion, and the mating portion selectively contacts the grease cover to position the grease cover relative to the generally annular portion.

8. The system of claim 1, wherein an interference between the grease cover and the groove portion selectively positions the grease cover relative to the generally annular portion.

9. A constant velocity joint comprising:
a rotational member having a generally cylindrical surface, wherein the generally cylindrical surface is defined, at least in part, by a groove portion;
a grease cover selectively positioned adjacent the rotational member, wherein at least a portion of a peripheral edge portion of the grease cover is positioned within the groove to retain the grease cover in a desired axial position relative to the rotational member; and
a plurality of finger portions extending from the peripheral edge portion, wherein each of the plurality of finger portions includes at least one alignment member and at least one retaining member, wherein the at least one alignment member and the at least one retaining member are separated by a recessed portion, and wherein the plurality of finger portions contact the groove to physically retain the grease cover within the groove without an additional securing element.

10. The constant velocity joint of claim 9, wherein the groove portion extends generally radially outward from the cylindrical surface and the cylindrical surface is an interior surface forming a recess within the rotational member.

11. The constant velocity joint of claim 9, wherein the peripheral edge portion is defined, at least in part, by an end surface, and at least a portion of the end surfaces bindingly engage at least a portion of a surface defining a portion of the groove portion to retain the grease cover in a desired axial position relative to the rotational member.

12. The constant velocity joint of claim 11, wherein at least a portion of the end surfaces do not contact the surface defining a portion of the groove portion.

13. The constant velocity joint of claim 9, wherein the groove portion is a generally continuous groove.

14. The constant velocity joint of claim 9, wherein the peripheral edge portion is defined by a plurality of end surface portions, and at least a portion of the end surface portions bindingly engage a surface defining a portion of the groove portion to retain the grease cover in a desired axial position relative to the rotational member.

15. The constant velocity joint of claim 9, wherein a portion of the peripheral edge portion is not positioned within the groove.

16. The constant velocity joint of claim 9, wherein a plurality of surface portions of the grease cover bindingly contact a surface portion of the groove to maintain a desired amount of compression on a sealing member.

17. The constant velocity joint of claim 9, wherein the rotational member is an outer race of the constant velocity joint.

18. A method of assembling a constant velocity joint comprising:
forming a groove in a generally cylindrical inner surface, wherein the inner surface defines a portion of the constant velocity joint;
configuring a cover member with a plurality of finger portions extending from a peripheral edge portion of the cover member, wherein the plurality of finger portions includes at least one alignment member and at least one retaining member, wherein the at least one alignment member and the at least one retaining member are separated by a recessed portion;
positioning a portion of a cover member within the groove; and
wherein the step of positioning includes expanding at least a portion of the peripheral edge into the groove with an insertion tool.

* * * * *

UNITED STATES PATENT AND TRADEMARK OFFICE
CERTIFICATE OF CORRECTION

PATENT NO. : 8,267,798 B2  
APPLICATION NO. : 12/519929  
DATED : September 18, 2012  
INVENTOR(S) : Michael Madden, Brian Michael Valovick and Jake Lawson Page 1 of 1

It is certified that error appears in the above-identified patent and that said Letters Patent is hereby corrected as shown below:

Column 6, lines 65-67 and column 7, lines 1-3 should read:

7. The system of claim 1, wherein the insertion tool includes an expanding portion and a mating portion, the expanding portion is selectively axially moveable relative to the mating portion, and the mating portion selectively contacts the grease cover to position the grease cover relative to the generally annular portion.

Signed and Sealed this  
Twenty-third Day of October, 2012

David J. Kappos  
*Director of the United States Patent and Trademark Office*